United States Patent [19]

Alexander, Jr.

[11] 4,449,295
[45] May 22, 1984

[54] DEVICE TO INSTALL DRAPERY HOOKS

[75] Inventor: Alfred Alexander, Jr., Westport, Mass.

[73] Assignee: Robertson Factories, Inc., Taunton, Mass.

[21] Appl. No.: 393,106

[22] Filed: Jun. 28, 1982

[51] Int. Cl.³ .................. B23P 19/00; B23P 11/00; B25B 27/14

[52] U.S. Cl. .................. 29/798; 29/432; 29/281.1

[58] Field of Search ............ 24/150 FP, 169, 345, 24/320, 364, 377, 380; D8/367; 160/395, 403, 404; 16/93 D, 95 D, 96 D; 29/432, 235, 450, 798, 281.1

[56] References Cited

U.S. PATENT DOCUMENTS

| | | | |
|---|---|---|---|
| 3,321,814 | 5/1967 | Graber | 24/345 |
| 4,090,652 | 5/1978 | Silverbush | 29/281.1 |
| 4,261,080 | 4/1981 | Ryan | 24/345 |
| 4,277,865 | 7/1981 | Takazawa | 24/345 |
| 4,344,210 | 8/1982 | Ryan | 24/345 |
| 4,407,051 | 10/1983 | Ryan | 24/345 |

Primary Examiner—Howard N. Goldberg
Assistant Examiner—Steven E. Nichols
Attorney, Agent, or Firm—Robert T. Gammons

[57] ABSTRACT

A device for installing drapery hangers comprising essentially a support for receiving one leg of a hanger having two legs one of which is to be positioned in a pocket at the top of the drape and the other of which is outside the pocket, said legs having respectively an aperture in one and a prong in the other, spaced guides for aligning the leg outside the pocket with the leg inside the pocket and a ram operable to move the leg outside the pocket in a direction to cause the prong to penetrate the pocket and become interlocked within the aperture in the leg within the pocket.

8 Claims, 9 Drawing Figures

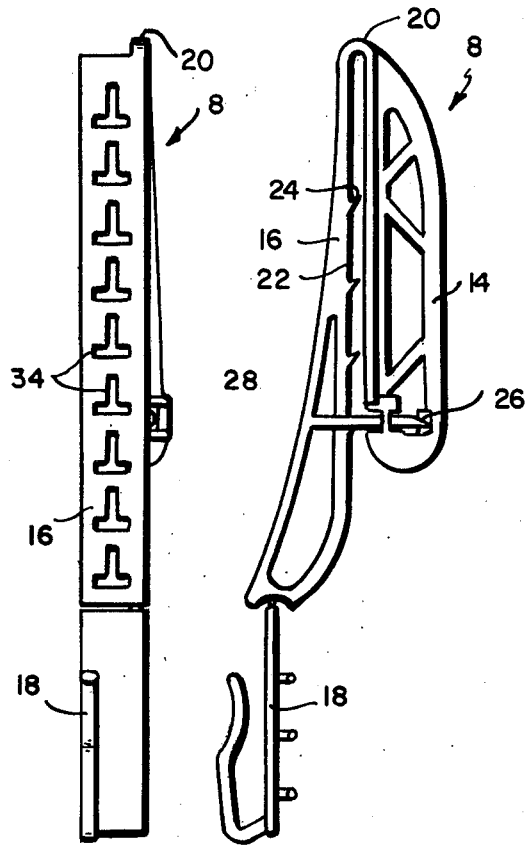
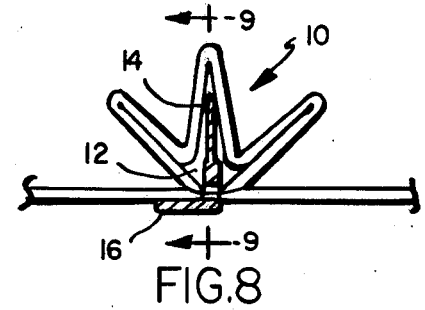
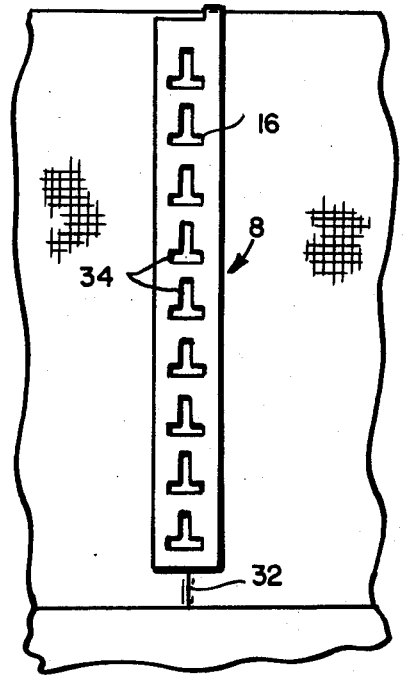
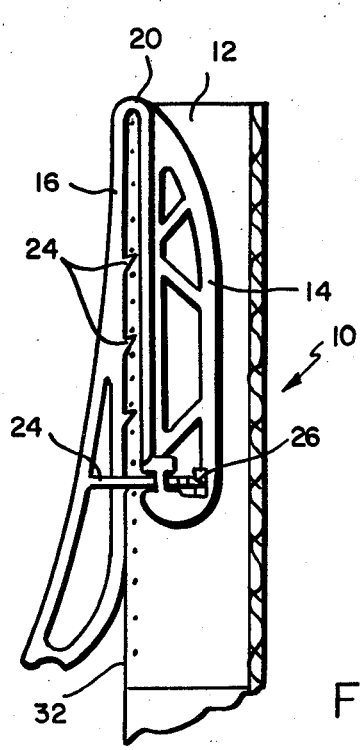
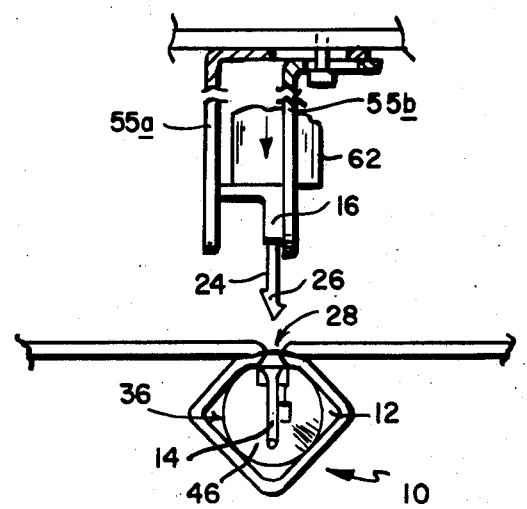
FIG.6  FIG.5  FIG.8  FIG.7  FIG.9  FIG.4

DEVICE TO INSTALL DRAPERY HOOKS

BACKGROUND OF THE INVENTION

Draperies are customarily suspended from a rigid rod by means of hangers inserted in pockets spaced along a pleated hem at the top. The conventional hanger is metal and has an inner leg which slides into the pocket and an outer leg provided with a hook for engagement with the rod. This invention relates to hangers of the aforesaid kind comprised of plastic wherein there are two legs, one of which is adapted to be slipped into the pocket and the other to be positioned outside the pocket which has on it prongs for engagement with the fabric of the hem, one at least of which is adapted to pierce the fabric and become engaged with an aperture in the other leg to lock the legs together and a detachable hook member adapted to be positioned at variable heights on the leg at the outer side to permit adjustment of the drape heightwise. The hanger described is assembled to the drape by the drape manufacturer and the assembly operation as currently done is accomplished by manually inserting the one leg of the hanger into the pocket and then pressing the leg at the outer side against the outer side, that is, the back side of the drape so as to cause the prongs to pierce the fabric and to engage one of the prongs within the aperture in the leg that is within the pocket. The operation is a blind one since the operator cannot see the leg in the pocket and because the folds of the pleat make it difficult to align the two legs so that the prong can be entered into the aperture and become locked therein. As a consequence, the cost of assembly is greater than the difference in cost achieved by substituting the more cheaply made plastic hanger for the conventional metal hanger. It is the purpose of this invention to provide a simple device for assembling the aforesaid plastic hangers rapidly and accurately, thus to take advantage of the less expensive cost of manufacture and to provide the customer with a ready to hang item.

SUMMARY

As herein illustrated, the device of the invention comprises means for interengaging interengageable parts through a penetratable part comprising a support for receiving and holding one of the interengageable parts, a guide supported above the support at a level spaced therefrom such as to enable placing the penetratable part on the support above the one interengageable part, said guide being adapted to receive the other of the interengageable parts and hold it in alignment with the one part held by the support such that the interengageable parts can be interengaged by rectilinear movement of the parts and means for moving said interengageable parts into engagement while confined to rectilinear movement relative to each other. Specifically, the device is for attaching hangers to drapes of the kind having a pleated top defining transversely-spaced pockets for receiving hangers and wherein the hangers have two legs one of which is positioned in a pocket and the other outside and wherein there are means on the confronting side of the legs for penetrating the pocket at least one of which is interengageable with the leg within the pocket to hold the legs together with the fabric of the drape sandwiched in between, and comprises an anvil dimensioned to be received within a pocket, said anvil containing a groove within which one leg of the hanger can be positioned such that one leg is disposed within the pocket of the pleat and the other outside the pocket, means defining a constraining guide positioned above the anvil for receiving the leg outside the pocket and holding it in alignment with the leg inside the pocket and a driver supported for movement toward the anvil in a direction to force the leg outside the pocket rectilinearly toward the leg inside the pocket as constrained by the guide into locking engagement with the leg inside the pocket. The means for penetrating the pocket are prongs on one leg, one of which is provided with a barb for interengagement with an aperture in the other leg. The anvil is cantilever-supported at one end in a substantially horizontal position, is dimensioned to be received within the pocket of the hem and contains at its upper side a longitudinally-extending groove for slidingly receiving the one leg of the hanger which is to be positioned within the pocket. The guide is mounted above the anvil and is adjustable transversely with respect to the anvil to enable aligning the leg outside the pocket with that inside the pocket to insure interengagement of the barbed prong of the leg at the outside of the pocket with the aperture of the leg inside the pocket. A pneumatically-operated piston is mounted above the anvil for vertical reciprocal movement to enable driving the leg at the outer side downwardly to cause penetration of the prongs through the seam at the base of the pleat and penetration of the barbed prong into the pocket and into the aperture in the leg positioned within the pocket. Desirably, there is a spring finger at the proximal end of the anvil for frictionally holding the seam of the pocket aligned with the leg positioned in the groove of the anvil after the pocket has been slipped onto the mandrel.

The invention will now be described in greater detail with reference to the accompanying drawings, wherein:

FIG. 4 is a fragmentary front elevation showing the drape positioned on the anvil with one leg of the hanger positioned in a groove in the anvil and the other leg positioned above the drape, this view also showing the guide means for guiding the legs of the hanger into interengagement and a ram for pressing the legs of the hanger into interengagement;

FIG. 5 is an elevation of the hanger from one side;

FIG. 6 is an elevation of the hanger from the left side of FIG. 5;

FIG. 7 is a fragmentary elevation of the inner side of the drape showing the hanger applied thereto;

FIG. 8 is a plan view of FIG. 7 showing the hanger in section; and

FIG. 9 is a section taken on the line 9—9 of FIG. 8.

Figures 1, 2, 3:
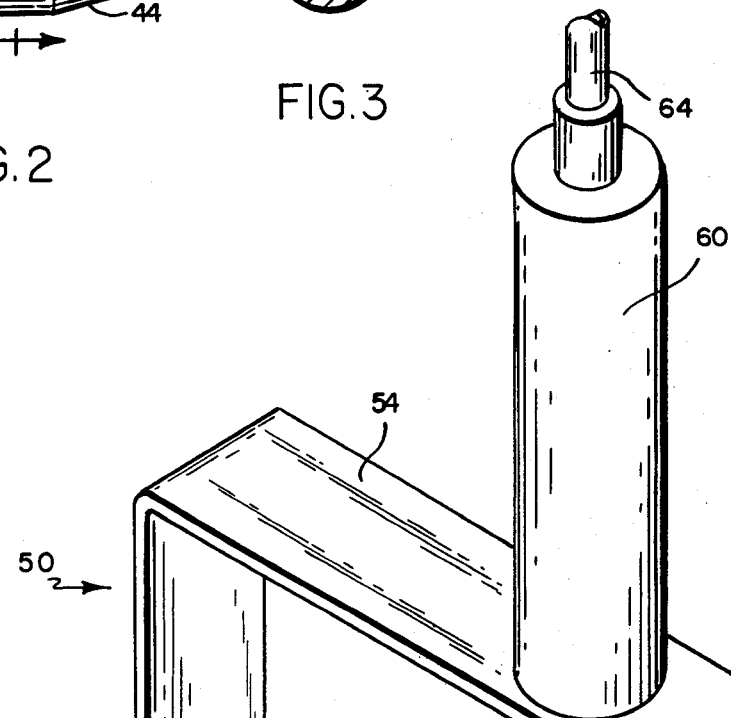
FIG. 1 is a perspective view of the device of this invention for applying hangers to drapes.
FIG. 2 is an elevation of the anvil as shown from the left side of FIG. 1.
FIG. 3 is a section taken on the line 3—3 of FIG. 2.

The conventional drape has along its top spaced pleats 10 as shown, for example, in FIG. 8 which define pockets 12 for receiving one leg of a hanger, the other leg of which is disposed outside the drape, that is, at the rear side of the drape with respect to the side normally viewed. These hangers are generally purchased by the customer and installed by the customer. Depending upon the vertical width of the hem, the customer has a limited selection of hangers which provide for vertical adjustment of the drape on the drapery rod. It is the purpose of this invention to provide in lieu of the metal hangers, plastic hangers 8, FIGS. 5 and 6, which are less expensive to manufacture and which provide for a large range of vertical adjustment of the drape on the drapery rod and, further, to provide for manufacturer installment in place of customer installment.

Each hanger as shown in FIGS. 5 and 6 comprises a leg 14 for engagement within the pocket 12 and leg 16 for disposition at the outside of the pocket, FIGS. 7 and 9, and a hook 18 detachably attached to the leg 16 in the process of the manufacture of the hanger. The legs 14 and 16 are connected by a hinge 20 integrally molded thereto. The leg 14 has an inner flat surface 20 and the leg 16 has an inner flat confronting surface 22 provided with a plurality of prongs 24 one of which is longer than the other and is provided with a barb 26. The leg 14 has an aperture 28 opposite the barbed prong 26 for receiving the barb 26 which when pressed through the aperture locks the two legs to each other.

Each hanger 8 prior to the design of the device which is the subject of this invention was manually assembled to the drape by inserting the leg 14 into the pocket 12 as shown in FIGS. 8 and 9 so that the leg 14 was positioned within the pocket and the leg 16 was positioned outside the pocket, whereupon the outer leg 16 was pressed toward the inner leg 14 to engage the prongs 24 with the material of the drape at the seam 32 forming the pleat and pocket defined thereby and to press the barbed prong 26 through the seam into the pocket and into locking engagement in the aperture 28 in the leg 14 within the pocket 12. FIG. 9 shows a section through the pleat 10 and pocket defined thereby at the seam 32. As thus attached, the leg 16 is at the rear side of the drape. The leg 16 as shown contains vertically-spaced, T-shaped slots 34 for receiving the hook 18 after it is detached from the leg 16.

As has been pointed out, the assembly has heretofore been done manually and is extremely difficult and time-consuming because when the leg 14 is placed within the pocket 12, it is almost impossible by reason of the bulkiness of the folds comprising the pleats to accurately align the barbed prong 26 within the aperture 28 to lockingly interengage them. The device of this invention as illustrated in FIGS. 1, 2, 3 and 4 is designed to enable quickly and easily assembling hangers of the kind described above within the pockets of a pleated drape. However, it is to be understood that the device can be used to attach hangers to unpleated drapes.

The device for accomplishing this comprises FIGS. 1, 2, 3 and 4 a cylindrical anvil 36 supported at one end in cantilever fashion on a base 38 provided along one edge with an upstanding supporting structure 40 which supports the anvil in spaced, parallel relation to the base 38. The anvil, as shown in FIGS. 2 and 3, has a generally cylindrical part 42 and a tapered part 44, the forward end 46 of which is sloped downwardly and rearwardly with respect to the top side. The anvil contains a longitudinally-extending groove 48 of sufficient width and depth to receive the leg 14 as shown, for example, in FIGS. 1 and 4. Above the anvil, there is mounted by means of a right angle bracket member 50, one leg 52 of which is attached to the structure 40, and the other leg 54 of which is space from and parallel to the anvil 36, a gauge assembly 56 comprising spaced, parallel legs 58a and 58b which project downwardly from the leg 54. The legs 58a and 58b are transversely adjustable and are designed to receive between them the leg 16 of the hanger when the leg 14 is positioned in the slot 48. By transverse adjustment of the gauge members 58a and 58b, the leg 16 may be adjusted transversely with respect to the leg 14 positioned in the slot so that the barbed prong 26 is in precise vertical alignment with the aperture 28 in the leg 14.

A cylinder and piston assembly 60 is mounted on the leg 54 provided with a plunger or ram 62 movable vertically toward the anvil 36 to press the leg 16 of the hanger downwardly toward the anvil and to force the prongs 24 into the fabric at the seam and the barbed prong 26 through the seam into the pocket and into the aperture 28 in the leg 14 to thus lock the legs to each other. A suitable connection 64 is provided for supplying the cylinder with a pressure fluid and, although not shown, there is conventional means for supplying pressure to the cylinder 60 when it is desired to actuate the ram 62. At the proximal end of the anvil 36, there is a hold-down arm 66 of flexible spring metal fastened by a bolt 68 to the leg 52 to frictionally hold the drape after the pocket of the pleat has been slipped on to the anvil with the seam aligned with the groove in the anvil.

In using the device as thus described, a hanger is mounted on the anvil by inserting the leg 14 into the slot 48 so that the hinged end 20 joining the legs is to the rear and the leg 16 extends forwardly and upwardly at an angle to the leg 14 which is held horizontally within the groove 48 with the distal end of the leg 16 positioned between the gauge members 58a and 58b. Assuming that the gauge members have been previously transversely aligned so that when the hanger is thus positioned, the barbed prong 26 is in perfect vertical alignment with the aperture 28, the drape to which the hanger is to be fastened is positioned on the anvil by engaging the pocket within which the hanger is to be secured over the forward end of the anvil until its upper edge is engaged under the hold-down 66, whereupon air is supplied to the cylinder 60 to cause the ram 62 to drive the leg 16 downwardly to engage the prongs 24 and to thrust the barbed prong 26 through the seam into locking engagement with the aperture 28 in the leg 14. The operation may then be repeated successively until all of the pockets transversely of the drape have received a hanger.

The device as thus described enables the manufacturer to assemble the hanger to a drape quickly and easily at minimum expense to the manufacturer thus providing the customer with a completely assembled item which requires for hanging only that the customer detach the hooks 18 and place them in suitable positions on the leg 16 to obtain the desired heightwise position of the drape on the drapery rod.

As previously explained, the device is not only useful for applying hangers such as described above to drapes having pleats at the top, but also to drapes which have only a hem along the top where because of the intervening material, it is difficult to align the legs precisely enough to enable driving the barbed prong on the one leg into the aperture in the other leg.

It should be understood that the present disclosure is for the purpose of illustration only and includes all modifications which fall within the scope of the appended claims.

What is claimed is:

1. A device for attaching hangers to drapes of the kind having a pleated top defining transverse spaced pockets for receiving hangers embodying interengageable parts, comprising an anvil dimensioned to be received within a pocket, said anvil containing a groove within which one of the parts of the hanger can be positioned such that said one part is disposed within the pocket and the other is disposed outside the pocket, means defining constraining guides positioned above the anvil for receiving the other of the parts outside the pocket and holding it in alignment with the limb inside the pocket and a driver supported for movement toward the anvil in a direction to force the part outside the pocket rectilinearly toward the part inside the pocket as constrained by the guide into locking engagement with the part inside the pocket.

2. A device for attaching a hanger to fabricated sheet material, said hanger embodying two elements, one of which has the said hanger and embodies a barbed prong and the other an aperture, comprising an anvil for supporting the element containing the aperture, a guide supported above the anvil at a level to permit a sheet material to which the hanger is to be attached to be placed on the anvil above the element containing the aperture, said guide being structured to receive and hold the element having the barbed prong in vertical alignment with the element containing the aperture, and means engageable with the element having the barbed prong to press the barbed prong through the sheet material into the aperture of the underlying element containing the aperture.

3. A device for attaching a hanger comprising connected generally opposed limbs astride the hem of a curtain with one limb at one side and the other limb on the other side wherein said limbs have on their confronting sides interengageable elements, comprising an anvil containing a groove for holding the hanger with one limb in a horizontal position and the other limb disposed at an angle thereto such that the hem of the curtain can be placed between limbs on the anvil over the one horizontal limb, guide means supported above the anvil structured to have engagement with the transverse opposite sides of the other limb to hold the latter in a position of vertical alignment with the underlying horizontal limb so that the respective interengageable elements on the two limbs are in vertical alignment and means movable into engagement with said other limb operable to move the latter toward the anvil to press the interengageable elements of the limbs into engagement.

4. A device according to claim 3 wherein the guide means is transversely-adjustable to enable positioning the limbs so that the interengageable elements can be positioned in alignment.

5. A device according to claim 3 wherein there is a keeper positioned above the anvil for holding the hanger within the groove.

6. A device according to claim 3 wherein the anvil is supported in a horizontal position so that the groove therein is disposed fore and aft, the guide means comprises spaced, parallel, vertically-positioned blades supported astride the anvil for adjustment transversely with respect to the groove therein and the means for moving the limbs into engagement is a piston supported rearwardly of the guide means above the anvil.

7. A device for aligning two elements for interengagement comprising a base member, an elongate anvil supported at one end in cantilever fashion spaced upwardly from and parallel to the base, said anvil containing a vertically-positioned, longitudinally-extending groove, an arm mounted on the base above and parallel to the anvil, vertically positioned guide means depending from the arm at the distal end of the anvil for adjustment transversely with respect to the groove to enable aligning an element positioned between the guide means with an element supported in the groove, and a ram supported on the arm above the anvil for reciprocal movement relative to the anvil to move the element positioned between the guide means into engagement with the element supported by the anvil to interengage the elements.

8. A device according to claim 7 comprising a spring element fixed to the support above and at the proximal end of the anvil to hold a part on the anvil in a position to have the elements engage with each other through the part.

* * * * *